United States Patent
Jacobs (12)

(10) Patent No.: US 6,351,396 B1
(45) Date of Patent: Feb. 26, 2002

(54) METHOD AND APPARATUS FOR DYNAMICALLY ALTERING OPERATION OF A CONVERTER DEVICE TO IMPROVE CONVERSION EFFICIENCY

(76) Inventor: Mark Elliott Jacobs, 7615 Applecross La., Dallas, TX (US) 75248

( * ) Notice: Subject to any disclaimer, the term of this patent is extended or adjusted under 35 U.S.C. 154(b) by 0 days.

(21) Appl. No.: 09/518,527

(22) Filed: Mar. 4, 2000

(51) Int. Cl.$^7$ .............................................. H02M 3/335
(52) U.S. Cl. ..................................... 363/21.6; 363/21.7
(58) Field of Search .............................. 363/21, 97, 98, 363/131, 132; 323/282, 222, 284

(56) References Cited

U.S. PATENT DOCUMENTS

| | | | |
|---|---|---|---|
| 3,735,235 A | * 5/1973 | Hamilton et al. | 363/26 |
| 4,338,658 A | * 7/1982 | Toy | 363/17 |
| 4,800,477 A | * 1/1989 | Esposito | 363/17 |
| 5,565,761 A | * 10/1996 | Hwang | 323/222 |
| 5,726,869 A | * 3/1998 | Yamashita et al. | 363/21 |
| 5,742,491 A | 4/1998 | Bowman et al. | 363/21 |
| 5,824,990 A | * 10/1998 | Geissler et al. | 363/142 |
| 5,920,475 A | * 7/1999 | Boylan et al. | 363/127 |
| 6,101,104 A | * 8/2000 | Eng | 363/89 |

\* cited by examiner

Primary Examiner—Rajnikant B. Patel
(74) Attorney, Agent, or Firm—Donald D. Mondul

(57) ABSTRACT

A method and apparatus for dynamically adjusting operation of a converter device to improve conversion efficiency. The converter device includes an inverter and a synchronous rectifier, and is driven by a plurality of drive signals having a duty cycle. The method comprises the steps of: (a) varying timing of a first drive signal a first amount; (b) observing the duty cycle of the conversion device; (c) further varying the first drive signal appropriately to alter the duty cycle toward an extremum; and (d) continuing to operate the converter device with the duty cycle proximate the extremum. In its most preferred embodiment, the method of the present invention includes the further step of: (e) periodically effecting steps (a)–(c) varying a drive signal other than the first drive signal. The comprises: (a) a drive varying means for varying timing of selected individual drive signals of the plurality of drive signals; and (b) a measuring means connected with the drive varying means for measuring the duty cycle. In its most preferred embodiment, the apparatus further comprises: (c) a control means for controlling the drive varying means. The control means is connected with the measuring means and with the drive varying means, and effects the controlling to operate the converter device proximate an extremum for the duty cycle.

19 Claims, 4 Drawing Sheets

METHOD AND APPARATUS FOR DYNAMICALLY ALTERING OPERATION OF A CONVERTER DEVICE TO IMPROVE CONVERSION EFFICIENCY

BACKGROUND OF THE INVENTION

The present invention is directed to electrical power supplies, and especially to direct current—to—direct current (DC-DC) power supplies, also referred to as power converters, or converters. Prior art control of DC-DC power converters has largely been effected using analog control techniques and circuitry. Such analog approaches involve integrated circuits or discrete circuit elements, and require a product designer to select a priori a preferred control parameter or parameters. The designer thus needed to desensitize the product to anticipated ordinary variations in circuitry parameters caused by component tolerances and operating conditions during the process of optimizing the design. Designers employing such prior art control techniques thus had to predict the environment their product would encounter—such as, temperature values, electrical parameter values, and load values. Such pertinent parameters had to be estimated in order to choose control parameter values to be monitored and their acceptable variations, reactions to control parameter variances beyond predetermined limits, and to which parameters the circuitry must be desensitized for acceptable or optimal performance.

Digital control of converters has been implemented on a limited basis. At present, analog controls for converters remain faster and less expensive than digital controls. Nevertheless, digital control techniques and circuitry for DC-DC power converters have advantages in that they provide opportunities for real-time adjustment of operational and control parameters. A controller based on a microprocessor or a digital signal processor (DSP) offers a circuit designer access to adaptable control processes limited mainly by software execution speeds.

A direct design approach to optimizing efficiency of an operating DC-DC power converter using a digital controller (e.g., using a microprocessor or a DSP) would be to measure output power and input power, and to adjust various controllable parameters to maximize the power ratio. This approach is straightforward and logical because it measures the very parameters that make up the calculation for efficiency of a power supply: output power and input power. However, such a direct approach is complex and costly to construct and implement because of additional components required to accomplish the required measurements. Converters are commonly employed in products with the converter output voltage regulated to a specified value. Additionally, converters often have a substantially constant input voltage. With those two values presenting little variation during normal power supply operation, advantage can be taken of the duty cycle of the power train, which depends upon the ratio of the output voltage and the input voltage, remaining relatively constant, particularly for continuous current mode (CCM) operation. Duty cycle, as described below, presents an indicator for real-time optimization of the efficiency of the power train by adjusting controllable parameters.

There have been some attempts to adaptively operate power supply devices to improve efficiency. U.S. Pat. No. 5,742,491 of Apr. 21, 1998, to Bowman et al for "Power Converter Adaptively Driven", discloses a drive circuit for a power converter. The Bowman invention provides an apparatus and method for adjusting the timing for driving a power supply circuit with respect to the primary switch employed in the device. Variations of drive timing are achievable in response to varying operating conditions experienced by the power supply device. The Bowman invention is intended to maximize efficiency of the power supply while keeping stresses on individual components of the power supply within acceptable limits. According to Bowman, the optimum drive timing for one set of operating conditions is different from optimum drive timing for another set of operating conditions. As an example, a synchronous rectifier drive timing that produces maximum efficiency at a first load condition may produce excessive voltage stress on the rectifier switch at a second, lesser load condition. Conversely, when the timing is changed to lower the voltage stress at the second load condition, a loss of efficiency is liable to occur at the first load condition. Bowman's apparatus and method provide for the designer an a priori adaptation of the delay between drive waveforms supplied to the inverter and synchronous rectifier of a power supply device as a function of an operating condition of the converter to allow the converter to operate efficiently in distinct operating environments over a range of operating conditions.

Bowman, therefore, succeeds in improving operation of a power supply device over a wider range of conditions. Bowman builds a representative test device and measures predetermined parameters associated with that test device in a laboratory environment. Bowman provides a delay circuit constructed for use in production devices as though the production devices will operate the same as the laboratory test devices that are the basis for Bowman's determinations in designing the delay circuit. That is, Bowman's does not provide dynamic real-time efficiency adjustment capability.

Prior art approaches to controlling DC-DC power converters during operation have relied upon fixed designs based upon engineering analysis or laboratory data to optimize efficiency for design-anticipated conditions. Some provisions for after-design adjustment of operating parameters have been attempted, but they have provided only coarse adjustment with less than ideal accommodation of changing conditions. There has been no facility for continuous real-time adjustment of parameters over a range to improve efficiency based upon real-time observation of extant parameters.

There is a need for an apparatus and method for providing fine adjustments of efficiency of a DC-DC power converter during normal operation to enable accommodation of varying operating conditions and device parameter variaton without adding significant cost or complexity to the converter design.

SUMMARY OF THE INVENTION

A method and apparatus or dynamically adjusting operation of a converter device to improve conversion efficiency is described. The converter device includes an inverter (and may include a synchronous rectifier) and is driven by a plurality of drive signals having a duty cycle. Each individual drive signal has a leading edge and a lagging edge. The method involves adjusting a controllable parameter and observing, or measuring, the duty cycle of a conversion device. In its preferred embodiment, the method comprises the steps of: (a) varying timing of a first drive signal a first amount; (b) observing the duty cycle of the conversion device; (c) further varying the first drive signal appropriately to alter the duty cycle toward an extremum; and (d) continuing to operate the converter device with the duty cycle proximate the extremum. In its most preferred embodiment, the method of the present invention includes the further step of: (e) periodically effecting steps (a)–(c) varying a drive signal other than the first drive signal. The apparatus of the present invention is an apparatus for dynamically altering operation of a converter device to improve conversion efficiency. The converter device includes an inverter and a synchronous rectifier (or, at least two actively controlled switches). The converter device is driven by a plurality of drive signals having a duty cycle. The apparatus comprises: (a) a drive varying means for varying timing of selected individual drive signals of the plurality of drive signals; and (b) a measuring means for measuring, or observing, the duty cycle. The measuring or observing means is connected with the drive varying means. In its most preferred embodiment, the apparatus of the present invention further comprises: (c) a control means for controlling the drive varying means. The control means is connected with the measuring or observing means and with the drive varying means, and effects the controlling to operate the converter device proximate an extremum for the duty cycle.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
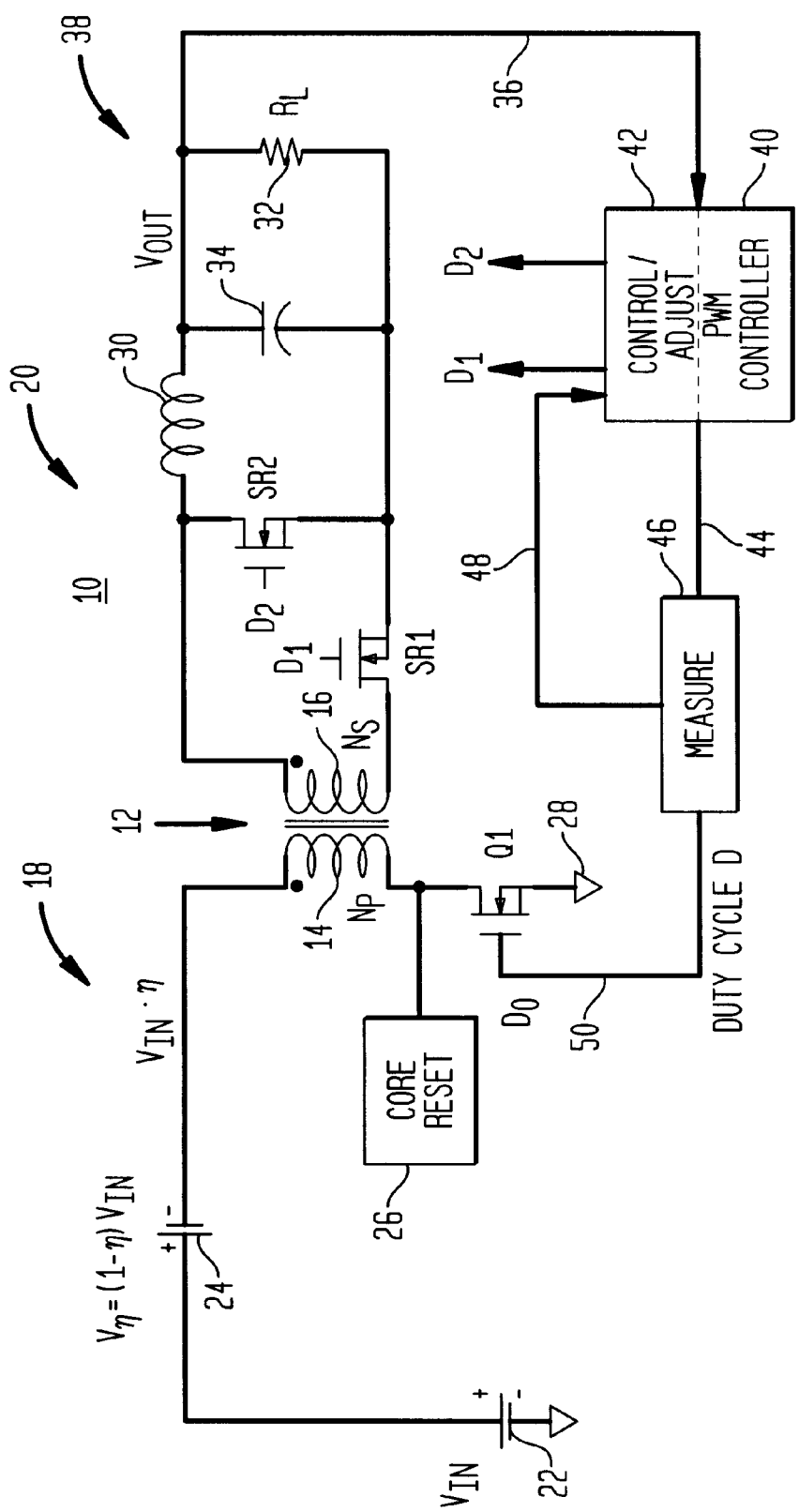
FIG. 1 is an electrical schematic diagram of the preferred embodiment of the apparatus of the present invention incorporated in a representative conversion device.

FIG. 1 is an electrical schematic diagram of the preferred embodiment of the apparatus of the present invention incorporated in a representative conversion device. In FIG. 1, a converter apparatus 10 includes an isolation transformer 12 having a primary winding 14 and a secondary winding 16. Primary winding 14 is included in a primary-side circuit 18, and secondary winding 16 is included in a secondary-side circuit 20. Isolation transformer 12 has a turns ratio of its primary winding 14 to its secondary winding 14 in the ratio:

$$\frac{Np}{Ns} \quad [1]$$

Primary-side circuit 18 has a power source, schematically represented by a battery 22 providing an input voltage $V_{IN}$ in FIG. 1. A second battery 24 is in opposing orientation with respect to battery 22 to schematically represent all the losses in converter apparatus 10. Battery 24 provides a voltage $V_\eta$ in an orientation opposing battery 22. Thus, battery 24 absorbs a portion of the energy supplied by battery 22.

Expressing efficiency η of converter apparatus 10 in terms of power in (Pin) and power out (Pout) as:

$$\eta = \frac{Pout}{Pin} \quad [2]$$

Opposing voltage $V_\eta$ provided by battery 24 may be expressed as:

$$V_\eta = (1-\eta) \cdot V_{IN} \quad [3]$$

As a result, the voltage applied to primary winding 14 is $(V_{IN} \cdot \eta)$, the difference between $V_{IN}$ and expression [3].

Primary-side circuit 18 also includes a core reset circuit 26 connected with primary winding 14, and a field effect transistor (FET) Q1 connected with primary winding 14. FET Q1 operates in response to a drive signal $D_0$ to connect primary winding 14 with ground at a point 28 at one value of drive signal $D_0$, and operates to disconnect primary winding 14 from ground at point 28 at another value of drive signal Do. Drive signal Do establishes the duty cycle D for converter 10. Thus, FET Q1 operates as an inverter in alternately connecting and disconnecting one end of primary winding 14 with ground point 28.

Secondary circuit 20 includes an output filter inductor 30 and a resistor 32 representing a load connected in series with secondary winding 16. An output filter capacitor 34 is connected in parallel with load resistor 32. A first synchronous rectifier SR1 is connected in series with load resistor 32, and a second synchronous rectifier SR2 is connected in parallel with load resistor 32 and filter capacitor 34. First synchronous rectifier SR1 is driven by a drive signal $D_1$; second synchronous rectifier SR2 is driven by a drive signal $D_2$.

A sense line 36 senses a parameter at output 38 of converter 10. The parameter sensed by sense line 36 is commonly output voltage $V_{OUT}$ of converter 10, but may be another parameter, if desired. It is common that output voltage $V_{OUT}$ is regulated to a fixed voltage in employing converters in circuits. It is for their regulated output voltage characteristics that such converter apparatuses are employed.

In converter apparatus 10 of FIG. 1, $$V_{OUT} = V_{IN} \cdot \frac{Ns}{Np} \cdot D \cdot \eta \quad [4]$$

Sense line 36 provides the sensed parameter from output 38 to a controller 40. In the preferred embodiment of converter 10, controller 40 is a pulse width modulator, but other control arrangements may be employed with success. Controller 40 preferably includes a control/adjust section 42 that enables controller 40 to vary drive signals $D_1$ and $D_2$.

The apparatus and method of the present invention are particularly advantageously employed with a converter apparatus in which controller 40 is embodied in a digital control device. Such a digital control device may be manifested in control circuitry involving microprocessors or digital signal processors or a combinatoin of such devices. The teachings of the present invention are not limited to digitally controlled converter apparatuses.

In the preferred embodiment of converter apparatus 10, controller 40 varies the timing of drive signals $D_1$ and $D_2$, as will be described later herein in connection with FIG. 4. Drive signal $D_1$ controls operation of synchronous rectifier SR1; drive signal $D_2$ controls operation of synchronous rectifier SR2. An output line 44 from controller 40 provides a signal to a measuring unit 46. The signal provided via output line 44 is affected by the parameter sensed at output 38 and delivered to controller 40 via sense line 36. Measuring unit 46 provides an indication of the signal delivered via output line 44 to control/adjust section 42 of controller 44 via a signal line 48. Preferably the signal provided via output line 44 to measuring unit 46 is applied to a drive line 50 substantially without modification. The signal provided on drive line 50 is drive signal $D_0$. Drive signal $D_0$ is employed to drive FET Q1 and establishes the duty cycle D of converter 10. Thus, converter apparatus 10 is configured to measure an output parameter at an output 38, employ the measured output parameter in establishing a drive signal $D_0$ to fix the measured output parameter at a desired value, and in deriving additional drive signals $D_1$, $D_2$ for operating synchronous rectifiers SR1, SR2. Further, duty cycle D (duty cycle D is established by drive signal $D_0$) is measured by measuring unit 46, and information relating to duty cycle D is provided to control/adjust section 42 of controller 40 to adjust drive signals D1, D2 to appropriately to urge converter apparatus 10 toward high power efficiency operation. Operation of converter apparatus 10 to achieve high power conversion efficiency will be discussed in greater detail in connection with FIGS. 2–5.

Figure 2:
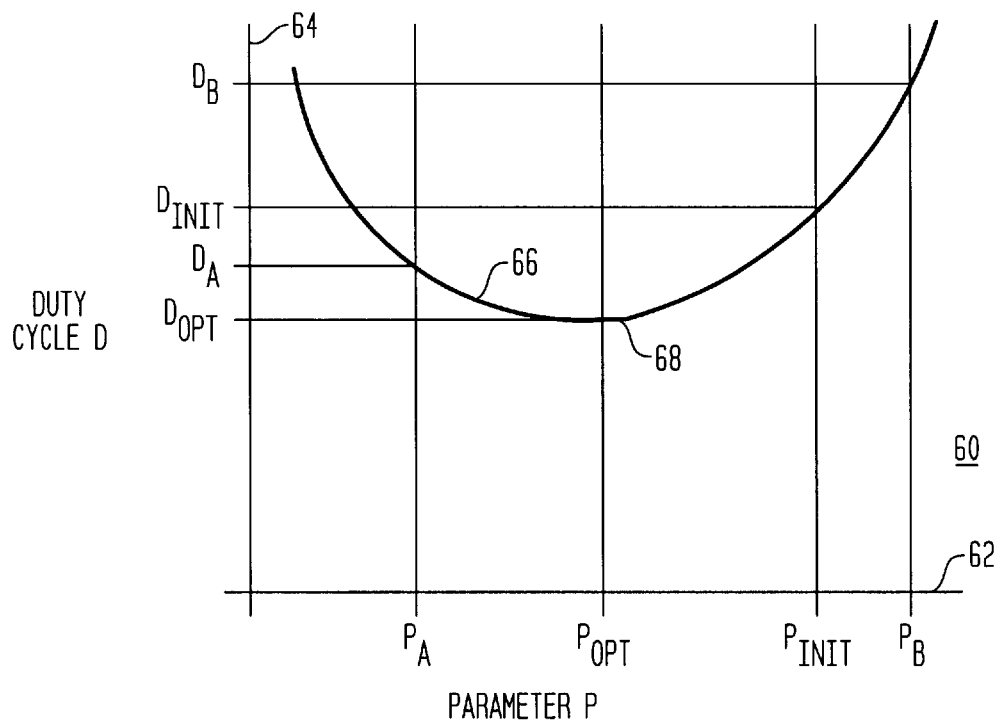
FIG. 2 is a schematic graphic representation of a relationship between duty cycle and a parameter in a conversion device.

FIG. 2 is a schematic graphic representation of a relationship between duty cycle and a parameter in a conversion device. In FIG. 2, an adjustable parameter P is plotted on a horizontal axis 62 of a graph 60. Duty cycle D of a converter apparatus, such as converter apparatus 10 (FIG. 1) is plotted on a vertical axis 64 of graph 60. A curve 66 graphically depicts the relationship between duty cycle D and adjustable parameter P of a converter apparatus. Curve 66 is representative of duty cycle-parameter relationships for several types of converter apparatuses. Other converter apparatuses may exhibit a somewhat different duty cycleparameter relationship, with the curved relationship bowing upwards. The important aspect common to such curves investigated by the inventor relating to duty cycle-to-parameter relationships is that each curve exhibits an observable and detectable extremum—a maximum or a minimum. It is the extremum, as at point 68 of curve 66, that is sought in practicing the method and operating the apparatus of the present invention. The precise shape of curve 66 is generally not known a priori for a particular converter apparatus; its values may be determined by trial and error.

By way of example, one may select an initial value $P_{INIT}$ for measured parameter P. As indicated in FIG. 2, a value of $P_{INIT}$ for parameter P gives one an initial value of duty cycle D, $D_{INIT}$. Next one may select a value of $P_B$ for parameter P. A value $P_B$ for parameter P yields a duty cycle D having a value $D_B$. Value $D_B$ for duty cycle D is higher than value $D_{INIT}$, associated with initial value $P_{INIT}$ of parameter P, for the example shown. An operator skilled in the pertinent art knows whether duty cycle D exhibits an extremum at a minimum value (as in FIG. 2, for example) or exhibits an extremum at a maximum value(not shown). Thus, in the case illustrated in FIG. 2, where duty cycle D is known to exhibit an extremum at a minimum value, on observing that duty cycle value $D_B$ is greater than duty cycle value $D_{INIT}$, where the value of $D_B$ is close to the value of $D_{INIT}$, an operator may conclude that parameter P should be adjusted in a direction opposite to the first adjustment in order to more closely approach maximizing duty cycle D. Accordingly, a new trial value $P_A$ is selected for parameter P. Parameter value $P_A$ yields a value of $D_A$ for duty cycle D. Value $D_A$ is lower than both previous values selected for parameter P (i.e., values $P_{INIT}$, $P_B$). A knowledgeable operator thus may confidently conclude that the optimum value $D_{OPT}$ for duty cycle D is related with a value for parameter P somewhere between values $P_A$ and $P_{INIT}$. Optimum value $D_{OPT}$ for duty cycle D may be stepwise approached in a manner well known for seeking to maximize a resulting value (such as duty cycle D) by searchingly varying an input value or values (such as adjustable parameter P), for example by fitting a parabolic curve to three trial points. In an operational environment, a converter apparatus may never reach and settle on an optimal value for duty cycle, but may iteratively approach such an optimal value throughout operations. Such continued operation at or about an optimal value for duty cycle results in overall improvement in conversion efficiency compared with operating with no dynamic adjustment relating to optimization.

Achieving (or operating in the vicinity of) an extremum for duty cycle is not readily apparent as a desirable end simply based upon the relationship illustrated in FIG. 2. However, if one observes the representative relationship illustrated in FIG. 3 in light of the relationship illustrated in FIG. 2, the benefits of operating at an extremum for duty cycle become clear.

Figure 3:
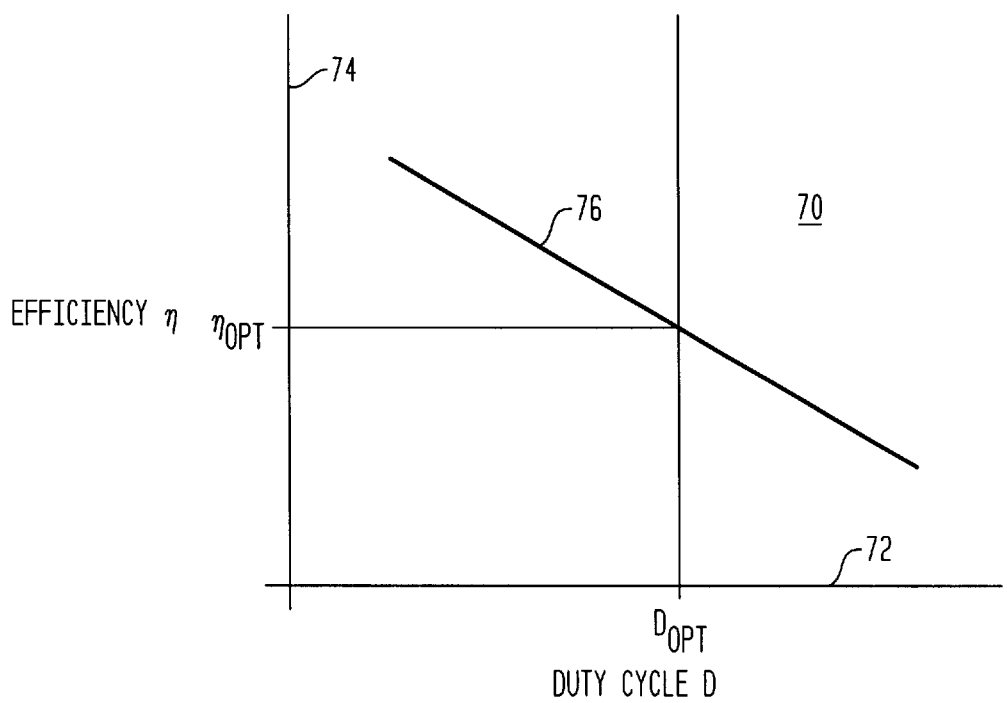
FIG. 3 is a schematic graphic representation of a relationship between duty cycle and conversion efficiency in a conversion device.

FIG. 3 is a schematic graphic representation of a relationship between duty cycle and conversion efficiency in a conversion device. In FIG. 3, duty cycle D is plotted on a horizontal axis 72 of a graph 70. Efficiency $\eta$ of a converter apparatus, such as converter apparatus 10 (FIG. 1) is plotted on a vertical axis 74 of graph 70. A curve 76 graphically depicts the relationship between efficiency $\eta$ and duty cycle D of the converter apparatus addressed by FIG. 3. Curve 76 is representative of several efficiency-duty cycle relationships for several types of converter apparatuses. Curve 76 appears to be nearly linear, and may be linear over a range of values of duty cycle D. The important representative relationship illustrated by curve 76 is a monotonic relationship between efficiency $\eta$ and duty cycle D. For the converter apparatus represented by exemplary graph 70, the efficiency-duty cycle relationship is negatively monotonic. That is, as duty cycle increases, efficiency decreases. Conversely, as duty cycle decreases, efficiency increases. Thus, it is clearly beneficial to minimize duty cycle in order to maximize efficiency as much as possible for this example. Graph 60 (FIG. 2) yielded a value for optimal duty cycle $D_{OPT}$ (a negative, or minimum extremum). Plotting the optimum duty cycle value $D_{OPT}$ on Graph 70 (FIG. 3) yields an optimal value for efficiency $\eta_{OPT}$. The shape of the relationships, such as the relationships illustrated in graphs 60, 70 (FIGS. 2–3 ), may be determined beforehand for a respective converter product and employed for "on the fly" adjustments to maximize efficiency. No special measurements of output power or other output parameters other than the normal parametric monitoring to assure constant output voltage (a common requirement for converters) is necessary. Other converter apparatuses may exhibit a somewhat different efficiency-duty cycle relationship than the relationship illustrated in graph 70 (FIG. 3). The important aspect common to such curves investigated by the inventor relating to efficiency-to-duty cycle relationships is that each curve exhibited a monotonic relationship. That is, as a first parameter (e.g., duty cycle) varies in a first direction, the second parameter (e.g., efficiency) varies in one direction. Conversely, as the first parameter (e.g., duty cycle) varies in a second direction opposite to the first direction, the second parameter varies in a direction opposite to the one direction first observed.

Duty cycle-to-parameter relationships exhibiting an extremum at a maximum value are associated with positively monotonic efficiency-to-duty cycle relationships. Duty cycle-to-parameter relationships exhibiting an extremum at a minimum value are associated with negatively monotonic efficiency-to-duty cycle relationships. Thus, seeking to optimize duty cycle to a maximum extremum will yield a maximum efficiency value using a positively monotonic efficiency-to-duty cycle relationship. Likewise, seeking to optimize duty cycle to a minimum extremum will yield a maximum efficiency value using a negatively monotonic efficiency-to-duty cycle relationship. It is not necessary to know the specific numerical values of the curves a priori, since only an efficiency extremum is sought by the process.

The apparatus and method of the present invention are valuable, but their value is offset by increased complexity and expense if additional parts are needed to effect measurements necessary to practice the inventions. Accordingly, it is preferred that a parameter used to seek to optimize duty cycle (e.g., as in connection with FIG. 2), is easily measured and easily controlled. FIG. 4 illustrates a selection of representative such parameters. However, the invention is not intended to be limited to using the parameters illustratively discussed in connection with FIG. 4 as the only parameters that can be used in practicing the invention. Any parameter that can be measured in its effect upon duty cycle is a candidate parameter for use with the apparatus and method of the present invention. For example, another useful parameter might be the specific gate voltages for driving a particular synchronous rectifier switch on or off.

Figure 4:
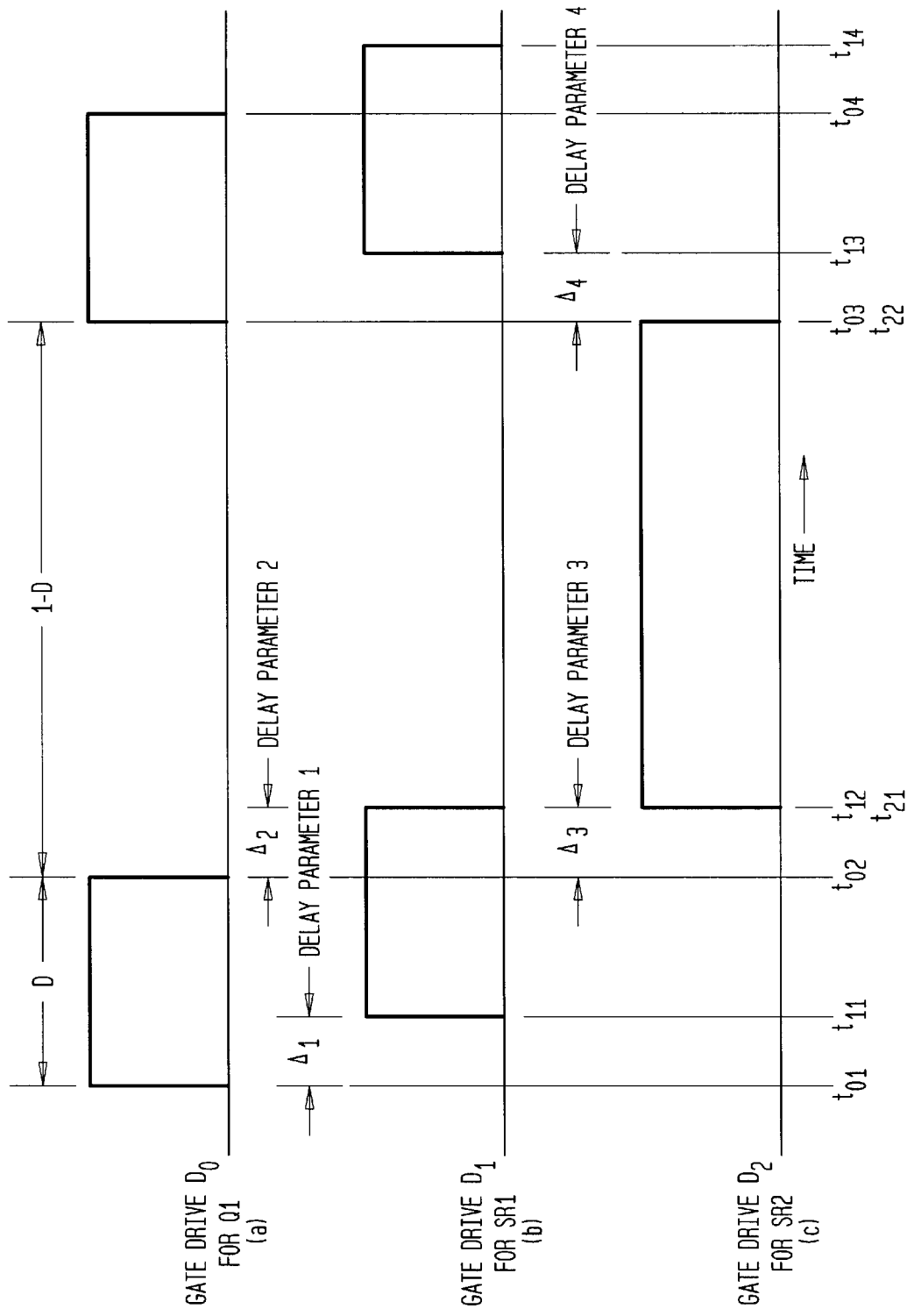
FIG. 4 is a schematic diagram illustrating relationships among various drive signals in a conversion device, such as the apparatus illustrated in FIG. 1.

FIG. 4 is a schematic diagram illustrating relationships among various drive signals in a conversion device, such as the converter apparatus illustrated in FIG. 1. In FIG. 4, three parameters are plotted on a common horizontal scale indicating time. Thus, in FIG. 4(a) gate drive signal $D_o$ driving FET Q1 (FIG. 1) is illustrated. Drive signal $D_o$ commences as a positive pulse at time $t_{01}$ and has a duration of a time interval $t_{01}$–$t_{02}$. Drive signal Do remains at a zero value until producing another pulse in the next subsequent period of the drive signal scheme during a time interval $t_{03}$–$t_{04}$. Thus, drive signal Do has a period with a duration measured by time interval $t_{01}$–$t_{03}$. The "ON" time for drive signal $D_o$, during time interval $t_{01}$–$t_{02}$, compared with the off time for drive signal $D_0$, during the time interval $t_{02}$–$t_{03}$, establishes a duty cycle D for drive signal $D_0$.

In FIG. 4(b), gate drive signal $D_1$ driving synchronous rectifier SR1 (FIG. 1) is illustrated. Drive signal $D_1$ is manifested as a pulse having a duration of a time interval $t_{11}$–$t_{22}$. Drive signal $D_2$ is repeated in a next subsequent period of the drive signal scheme during a time interval $t_{13}$–$t_{14}$.

In FIG. 4(c), gate drive signal $D_2$ driving synchronous rectifier SR2 (FIG. 1) is illustrated. Drive signal $D_2$ is manifested as a pulse having a duration of a time interval $t_{21}$–$t_{22}$. Drive signal $D_2$ is repeated in a next subsequent period of the drive signal scheme (not shown in FIG. 4).

Of particular interest in comparing drive signals $D_0$, $D_1$, $D_2$ are the adjustable delay intervals among the signals. Specifically, first delay interval $\Delta_1$ is defined by a time interval $t_{01}$ –$t_{11}$. First delay interval $\Delta_1$ is the delay between the commencement of drive signal $D_0$ and the commencement of drive signal $D_1$. A second delay interval $\Delta_2$ is defined by a time interval $t_{02}$–$t_{12}$. Second delay interval $\Delta_2$ is the delay between ending the drive signal $D_0$ pulse and ending the drive signal $D_1$ pulse. A third delay interval $\Delta_3$ is defined by a time interval $t_{02}$–$t_{21}$. Third delay interval $\Delta_3$ is the delay between ending the drive signal $D_0$ pulse and beginning the drive signal $D_2$ pulse. A fourth delay interval $\Delta_4$ is defined by a time interval $t_{22}$–$t_{13}$. Fourth delay interval $\Delta_4$ is the delay between ending the drive signal $D_2$ pulse and beginning the drive signal $D_1$ pulse in the next subsequent period of the drive signal pattern.

Figure 5:
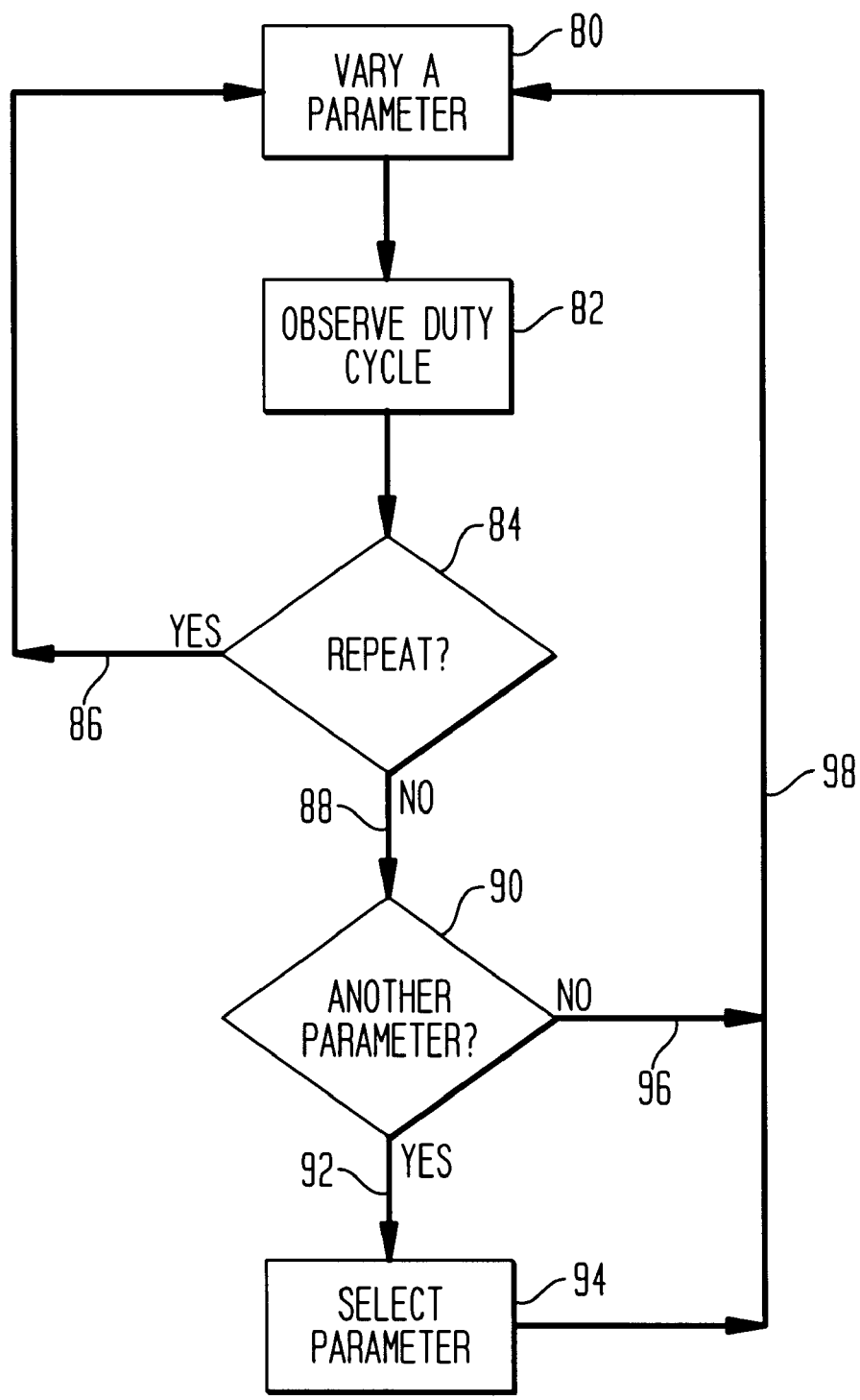
FIG. 5 block diagram illustrating the preferred embodiment of the method of the present invention.

Delay intervals $\Delta_1$, $\Delta_2$, $\Delta_3$, $\Delta_4$ are controllable, as by control/adjust section 42 of controller 40 (FIG. 1). Thus, delay intervals $\Delta_1$, $\Delta_2$, $\Delta_3$, $\Delta_4$ may be easily employed as parameters for practicing the method and operating the apparatus of the present invention. Employing adjustable time delays such as delay intervals $\Delta_1$, $\Delta_2$, $\Delta_3$, $\Delta_4$ to ascertain an extremum for duty cycle (FIG. 2) is easily accomplished without any need for complex or expensive additional circuitry to make the required measurements. Any one of the delay intervals $\Delta_1$, $\Delta_2$, $\Delta_3$, $\Delta_4$ may be employed to practice the method and operate the apparatus of the present invention. The preferred embodiment of the apparatus and method of the present invention is to employ more than one of the delay intervals $\Delta_1$, $\Delta_2$, $\Delta_3$, $\Delta_4$ in a cyclical application of the adjustment to ascertain an extremum for duty cycle D (FIG. 2) and adjusting each respective delay interval under consideration in turn to achieve maximum efficiency (FIG. 3). A continued cyclical, repetitive application of the measurement and adjustment to ascertain an extremum for duty cycle D will provide the greatest likelihood of operating near the highest level of efficiency during the operation of the converter apparatus. As mentioned earlier, the parameters identified in FIG. 4 are representative only. Any parameter that impacts duty cycle of a converter may be employed in practicing the present invention FIG. 5 is a block diagram illustrating the preferred embodiment of the method of the present invention. In FIG. 5, the method begins with having selected a parameter for use in varying duty cycle of a converter apparatus and varying the selected parameter, as indicated by a block 80. As the selected parameter is varied, one observes behavior of the duty cycle of the converter apparatus, as indicated by a block 82. Having noted any change in duty cycle (block 82) resulting from having varied the selected parameter (block 80), a query is posed inquiring whether it is desirable to repeat the steps represented by blocks 80, 82, as indicated by a query block 84. If it is determined that it is desirable to repeat the method steps represented by blocks 80, 82, the method proceeds via "YES" response line 86 to return the method execution to block 80 for the desired repetition. Such a decision to repeat the method steps represented by blocks 80, 82 may be made, for example, when it is determined that the converter apparatus is not yet operating satisfactorily close enough to an extremum for duty cycle, or that a series of adjustments is no longer producing an appreciable increment of efficiency.

If it is determined not desirable to repeat the method steps represented by blocks 80, 82, the method proceeds via "NO" response line 88. Such a decision to not repeat the method steps represented by blocks 80, 82 may be made, for example, when it is determined that the converter apparatus is operating satisfactorily close enough to an extremum for duty cycle. This process of choosing whether to repeat method steps represented by blocks 80, 82 depending upon responsive changes in duty cycle (block 82 ) to changes in the selected parameter (block 80 ) and whether the converter apparatus is operating satisfactorily close enough to an extremum for duty cycle is the process described briefly in connection with FIG. 2. In that process, one looks to a resulting value for duty cycle associated with a selected value for a parameter in deciding whether to vary the parameter again to seek a value for duty cycle closer to an extremum for duty cycle (DOPT in FIG. 2).

The method continues in FIG. 5 by posing another query whether another parameter is desired to carry the method further, as represented by a query block 90. This query represents the preferred embodiment of the present invention discussed briefly in connection with FIG. 4 wherein it was established that practicing the method cyclically for a plurality of parameters likely yields a higher sustained level of conversion efficiency than would be attainable using only a single variable parameter in practicing the invention. If it is desired that another parameter be employed in practicing the invention, the method proceeds via "YES" response line 92 and another parameter is selected, as represented by a block 94. The method then begins anew using the parameter selected according to block 94, as indicated by a return line 98 to block 80. If it is not desired that another parameter be employed in practicing the invention, the method proceeds via "NO" response line 96 and the first parameter is employed to begin the method anew, as indicated by return line 98 to block 80.

The method illustrated in FIG. 5 contemplates continuous adjustment operations. The method could incorporate a decision block (not shown) to suspend adjustment operations when a predetermined condition is achieved. Recommencement of adjustment operations may be effected when certain conditions are met, after a predetermined time delay, or based upon some other parameter or parameters.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A method for dynamically altering operation of a power converter device to improve power conversion efficiency, the device using a duty cycle of a switch in a closed loop arrangement with an output locus to regulate a first operational parameter at a substantially constant value at said output locus; the method comprising the steps of:

(a) varying a second operational parameter of said device a first amount; said varying being effected while continuing to regulate said first operational parameter substantially at said constant value;

(b) observing said duty cycle of said switch; and (c) repeating steps (a) and (b) until an extremum for said duty cycle is approximated.

2. A method for dynamically altering operation of a power converter device to improve power conversion efficiency as recited in claim 1 wherein the method comprises the further steps of:

(d) repeating steps (a) through (c) for selected at least one other operational parameter than said first operational parameter and said second operational parameter.

3. A method for dynamically altering operation of a power converter device to improve power conversion efficiency as recited in claim 2 wherein the method comprises the further steps of:

(e) repeating steps (a) through (d) at least intermittently to maintain said duty cycle proximate said extremum.

4. A method for dynamically altering operation of a power converter device to improve power conversion efficiency as recited in claim 1 wherein the method comprises the further steps of:

(d) repeating steps (a) through (c) at least intermittently to maintain said duty cycle proximate said extremum.

5. An apparatus for dynamically altering operation of a power converter device to improve power conversion efficiency; said power converter device including an inverter and a synchronous rectifier; said inverter being driven by a first drive signal having a first duty cycle; said inverter being coupled in a closed loop arrangement with an output locus to regulate a first operational parameter at a substantially constant value at said output locus; said synchronous rectifier-being driven by at least one second drive signal having at least one second duty cycle; the apparatus comprising:

(a) a drive varying means for varying timing of at least one of said first drive signal and said at least one second drive signal; said drive varying means being coupled in said closed loop arrangement; said drive varying means varying said timing of said first drive signal to effect said regulating said first operational parameter; said drive varying means varying said timing of said at least one second drive signal to effect variance of said first duty cycle; and (b) a measuring means for measuring said first duty cycle; said measuring means being connected with said drive varying means.

6. An apparatus for dynamically altering operation of a power converter device to improve power conversion efficiency as recited in claim 5 wherein each of said first drive signal and said at least one second drive signal has a leading edge and a lagging edge and wherein said varying timing of said first drive signal and said at least one second drive signal is effected by varying intervals between a first selected said lagging edge or leading edge of one drive signal of said first drive signal and said at least one second drive signal and a second selected said lagging edge or leading edge of another drive signal of said first drive signal and said at least one second drive signal.

7. An apparatus for dynamically altering operation of a power converter device to improve power conversion efficiency as recited in claim 5 wherein the apparatus further comprises:

(c) a control means for controlling said drive varying means; said control means being connected with said measuring means and with said drive varying means.

8. An apparatus for dynamically altering operation of a power converter device to improve power conversion efficiency as recited in claim 7 wherein said control means effects said controlling to operate said converter device proximate an extremum for said first duty cycle.

9. An apparatus for dynamically altering operation of a power converter device to improve power conversion efficiency as recited in claim 6 wherein the apparatus further comprises:

(c) a control means for controlling said drive varying means; said control means being connected with said measuring means and with said drive varying means.

10. An apparatus for dynamically altering operation of a power converter device to improve power conversion efficiency as recited in claim 9 wherein said control means effects said controlling to operate said converter device proximate an extremum for said first duty cycle.

11. A method for dynamically adjusting operation of a converter device to improve conversion efficiency; said converter device including an inverter and a synchronous rectifier; said inverter being driven by a first drive signal having a first duty cycle; said inverter being coupled in a closed loop arrangement with an output locus to regulate a first operational parameter at a substantially constant value at said output locus; said synchronous rectifier being driven by at least one second drive signal having at least one second duty cycle; the method comprising the steps of:

(a) varying timing of one drive signal of said at least one second drive signal a first amount;

(b) observing said first duty cycle;

(c) further varying said one drive signal appropriately to alter said first duty cycle toward an extremum; and (d) continuing to operate said converter device with said first duty cycle proximate said extremum.

12. A method for dynamically adjusting operation of a converter device to improve conversion efficiency as recited in claim 11 wherein the method comprises the further step of:

(e) periodically effecting steps (a)–(c) varying timing of another drive signal of said at least one second drive signal other than said one drive signal.

13. A method for dynamically adjusting operation of a converter device to improve conversion efficiency as recited in claim 11 wherein each of said first drive signal and said at least one second drive signal has a leading edge and a lagging edge and wherein step (a) is effected by varying intervals between a first selected said lagging edge or leading edge of one drive signal of said first drive signal and said at least one second drive signal and a second selected said lagging edge or leading edge of another drive signal of said first drive signal and said at least one second drive signal.

14. A method for dynamically adjusting operation of a converter device to improve conversion efficiency as recited in claim 12 wherein each of said first drive signal and said at least one second drive signal has a leading edge and a lagging edge and wherein step (a) is effected by varying intervals between a first selected said lagging edge or leading edge of one drive signal of said first drive signal and said at least one second drive signal and a second selected said lagging edge or leading edge of another drive signal of said first drive signal and said at least one second drive signal.

15. An apparatus for dynamically altering operation of a power converter device to improve power conversion efficiency; said power converter device including an inverter and a synchronous rectifier; said inverter being driven by a first drive signal having a first duty cycle; said inverter being coupled in a closed loop arrangement with an output locus to regulate a first operational parameter at a substantially constant value at an output locus; said synchronous rectifier being driven by a plurality of second drive signals, each respective second drive signal of said plurality of second drive signals having a respective second duty cycle; the apparatus comprising:

(a) a drive control circuit for controlling timing of at least one of said first drive signal and said plurality of second drive signals; said drive control circuit being coupled in said closed loop arrangement; said drive control circuit varying said timing of said first drive signal to effect said regulating said first operational parameter; said drive control circuit varying said timing of said at least two second drive signals to effect variance of said first duty cycle; and (b) a measuring circuit for measuring said first duty cycle; said measuring circuit being connected with said drive control circuit.

16. An apparatus for dynamically altering operation of a power converter device to improve power conversion efficiency as recited in claim 15 wherein said drive control circuit is a digital control circuit.

17. An apparatus for dynamically altering operation of a power converter device to improve power conversion efficiency as recited in claim 16 wherein each of said first drive signal and said at least two second drive signals has a leading edge and a lagging edge and wherein said varying timing of said first drive signal and said at least two second drive signals is effected by varying intervals between a first selected said lagging edge or leading edge of one drive signal of said first drive signal and said at least two second drive signals and a second selected said lagging edge or leading edge of another drive signal of said first drive signal and said at least two second drive signals.

18. An apparatus for dynamically altering operation of a power converter device to improve power conversion efficiency as recited in claim 17 wherein the apparatus further comprises:

(c) a varying circuit for controlling said drive control circuit; said varying circuit being connected with said measuring circuit and with said drive control circuit.

19. An apparatus for dynamically altering operation of a power converter device to improve power conversion efficiency as recited in claim 18 wherein varying circuit effects said controlling to operate said converter device proximate an extremum for said first duty cycle.

* * * * *